US008218788B2

(12) United States Patent
Okumura et al.

(10) Patent No.: US 8,218,788 B2
(45) Date of Patent: Jul. 10, 2012

(54) ANTI-FEEDBACK DEVICE AND ANTI-FEEDBACK METHOD

(75) Inventors: Hiraku Okumura, Hamamatsu (JP); Hirobumi Tanaka, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 384 days.

(21) Appl. No.: 12/645,203

(22) Filed: Dec. 22, 2009

(65) Prior Publication Data

US 2010/0166213 A1 Jul. 1, 2010

(30) Foreign Application Priority Data

Dec. 25, 2008 (JP) ................................ 2008-331498

(51) Int. Cl.
*H04B 15/00* (2006.01)
*H04R 27/00* (2006.01)
*H04R 25/00* (2006.01)

(52) U.S. Cl. ............................ 381/93; 381/83; 381/318

(58) Field of Classification Search .................... 381/93, 381/83, 318, 317, 94, 95
See application file for complete search history.

(56) References Cited

U.S. PATENT DOCUMENTS

| | | | | |
|---|---|---|---|---|
| 5,263,019 | A * | 11/1993 | Chu | 370/288 |
| 5,619,580 | A * | 4/1997 | Hansen | 381/314 |
| 5,677,987 | A * | 10/1997 | Seki et al. | 704/226 |
| 6,301,357 | B1 * | 10/2001 | Romesburg | 379/406.06 |
| 7,174,027 | B2 * | 2/2007 | Arndt et al. | 381/318 |
| 7,242,762 | B2 * | 7/2007 | He et al. | 379/406.08 |
| 7,324,651 | B2 * | 1/2008 | Roeck | 381/318 |
| 7,365,669 | B1 | 4/2008 | Melanson | |
| 2005/0271222 | A1 | 12/2005 | Freed et al. | |
| 2009/0028367 | A1 | 1/2009 | Klinkby | |
| 2010/0296680 | A1 * | 11/2010 | Korl et al. | 381/318 |

FOREIGN PATENT DOCUMENTS

| | | | |
|---|---|---|---|
| DE | 3431 141 | A1 | 3/1986 |
| JP | 2006-217542 | A | 8/2006 |
| WO | WO-2007/113283 | A1 | 10/2007 |
| WO | WO-2008/118279 | A1 | 10/2008 |

OTHER PUBLICATIONS

European Search Report mailed Sep. 21, 2010, for EP Application No. 09180288.4, five pages.

Joson, H.A.L. et al. (Dec. 1993). "Adaptive Feedback Cancellation with Frequency Compression for Hearing Aids," *J. Acoust. Soc. Am.* 94(6):3248-3254.

Rombouts, G. et al. (Jan. 2006). "Proactive Notch Filtering for Acoustic Feedback Cancellation," *Proceedings of SPS-DARTS 2006, 2nd Annual IEEE BENELUX/DSP Valley Signal Processing Symposium*, Antwerp, Belgium, Mar. 2006, pp. 169-172.

* cited by examiner

*Primary Examiner* — Vivan Chin
*Assistant Examiner* — Andrew Graham
(74) *Attorney, Agent, or Firm* — Morrison & Foerster

(57) ABSTRACT

An anti-feedback device includes an anti-feedback filter provided in a closed loop. The anti-feedback device down-samples a signal of specific band selected from an output signal of an adaptive target signal transfer system and a signal of the same band selected from an input signal of the transfer system, and a filtering coefficient of the adaptive filter is updated by use of the down-sampled signals. The filter controller controls a filtering characteristic of the anti-feedback filter so that a peak gain of a frequency of an amplitude characteristic within a specific band of a closed loop determined from the filtering coefficient of the adaptive filter is suppressed. Moreover, the filter controller estimates a gain of the closed loop outside the specific band from the amplitude characteristic in the specific band and controls the amount of suppression of the anti-feedback filter outside the band in accordance with a result of estimation.

6 Claims, 4 Drawing Sheets

ANTI-FEEDBACK DEVICE AND ANTI-FEEDBACK METHOD

BACKGROUND OF THE INVENTION

1. Technical Field

The present invention relates to an art for suppressing feedback by use of an adaptive filter.

2. Background Art

Occurrence of feedback causes problems in many cases in the field of an acoustic feedback system that amplifies a signal of sound collected within single acoustic space by means of a microphone and that emits the thus-amplified signal from a speaker. An anti-feedback device utilizing an adaptive filter is available as means for suppressing such feedback. Such an anti-feedback device generates from a signal input to the speaker a simulated signal that simulates a circulatory sound component, which originates from a speaker and enters a microphone, by means of an adaptive filter. The simulated signal is cancelled out by the signal output from the microphone. However, when a change arises in the state of a transmission system of circulatory sound, the adaptive filter consumes much time before outputting a simulated signal that accurately simulates circulatory sound achieved after occurrence of a change in the state of the transmission system. For this reason, the anti-feedback device utilizing an adaptive filter encounters a problem of being unable to sufficiently suppress feedback in a situation where an abrupt change arises in the state of the circulatory sound transmission system. The anti-feedback device utilizing an adaptive filter also encounters a problem of so-called coloration arising when the adaptive filter has insufficient accuracy in estimation of circulatory sound or when a change arises in positional relationship between a speaker and a microphone.

Patent Document 1 and Non-Patent Document 1 disclose arts using an adaptive filter and a notch filter in combination as an art for enhancing suppression of feedback. An anti-feedback device described in Patent Document 1 suppresses circulatory sound components by means of an adaptive filter. When feedback occurs, a notch filter performs processing for attenuating a component of frequency at which feedback arises by means of a signal acquired by way of a microphone. An anti-feedback device described in Non-Patent Document 1 suppresses a circulatory component by means of an adaptive filter of PEM-AFROW type. A notch filter performs processing for estimating a frequency at which a transmission system that connects a speaker to a microphone exhibits a peak and for attenuating the thus-estimated frequency component by means of a signal acquired by way of the microphone.

[Patent Document 1] JP-A-2006-217542

[Non-Patent Document 1] G. Rombouts, T. Watershoot, M. Moonen, “Proactive notch filtering for acoustic feedback cancellation,” Proc 2nd Annual IEEE Benelux/DSP Valley Signal Process. Symp. April 2006, pp. 169-172

In the art described in Non-Patent Document 1, appropriate suppression of feedback requires an adaptive filter whose filtering coefficient accurately reflects an amplitude characteristic of a closed loop. To this end, updating a filtering coefficient requires a large amount of arithmetic calculation, which raises a problem of difficulty in enhancing the speed of anti-feedback processing.

SUMMARY OF THE INVENTION

The present invention has been conceived against such a background and aims at providing an anti-feedback device and an anti-feedback method that can suppress feedback and that can increase the speed of anti-feedback processing.

According to an aspect of the invention, there is provided an anti-feedback device including: an anti-feedback filter provided in a closed loop including a microphone and a speaker that are disposed in a single acoustic space, wherein an adaptive target signal transfer system includes at least a route from the speaker to the microphone and the anti-feedback filter; a first input processing section that selects a signal belonging to a specific band from a signal output from the adaptive target signal transfer system, and that down-samples the selected signal to a sampling frequency suitable for the specific band and outputs the down-sampled signal; a second input processing section that selects a signal belonging to the specific band from a signal input to the adaptive target signal transfer system, and that down-samples the selected signal to a sampling frequency suitable for the specific band and outputs the down-sampled signal; an adaptive filter that subjects a signal output from the second input processing section to filtering processing, to thus generate a simulated output signal that simulates a signal output from the adaptive target signal transfer system by way of the first input processing section, that cancels out the simulated output signal by means of the signal output from the first input processing section and outputs a signal subjected to cancellation, and that updates a filtering coefficient for the filtering processing so that the simulated output signal simulates the signal output by way of the first input processing section based on the signal subjected to cancellation; an output processing section that up-samples the signal output from the adaptive filter to the same sampling frequency as that at which the signal output from the adaptive target signal transfer system is sampled and that adds the up-sampled signal to a signal outside the specific band in the signal output from the adaptive target signal transfer system and outputs a result of addition to the closed loop; a time-frequency conversion section that determines an amplitude characteristic of the closed loop in accordance with the filtering coefficient used for the filtering processing of the adaptive filter; and a filter control section that controls a filtering characteristic of the anti-feedback filter so that a peak gain of a frequency among gain of the specific band in the amplitude characteristic of the closed loop determined by the time-frequency conversion section is suppressed, that estimates a gain of the closed loop outside the specific band in accordance with the amplitude characteristic in the specific band of the closed loop determined by the time-frequency conversion section, and that controls an amount of suppression of the anti-feedback filter outside the specific band in accordance with a result of estimation.

The anti-feedback device down-samples a signal of specific band selected from an output signal of an adaptive target signal transfer system and a signal of the same band selected from an input signal of the adaptive target signal transfer system, and a filtering coefficient of the adaptive filter is updated by use of the down-sampled signals. The filter controller controls a filtering characteristic of an anti-feedback filter so that a peak gain of a frequency of an amplitude characteristic within a specific band of a closed loop determined from the filtering coefficient of the adaptive filter is suppressed. Moreover, the filter controller estimates a gain of the closed loop outside the specific band from the amplitude characteristic in the specific band and controls the amount of suppression of the anti-feedback filter outside the band in accordance with a result of estimation. Therefore, the amount of arithmetic computation pertaining to updating of a filtering coefficient of a filter in the adaptive filter is reduced, so that the speed of processing for suppressing feedback over the entire band can be increased.

According to an aspect of the invention, there is provided an anti-feedback method in a closed loop including an anti-feedback filter, a microphone and a speaker that are disposed in a single acoustic space, wherein an adaptive target signal transfer system includes at least a route from the speaker to the microphone and the anti-feedback filter, the anti-feedback method including the steps of: selecting a first signal belonging to a specific band from a signal output from the adaptive target signal transfer system; and down-sampling the selected signal to a sampling frequency suitable for the specific band to output the first down-sampled signal; selecting a second signal belonging to the specific band from a signal input to the adaptive target signal transfer system, and down-sampling the selected signal to a sampling frequency suitable for the specific band to output the second down-sampled signal; subjecting the down-sampled signal of the second signal to filtering processing, to thus generate a simulated output signal that simulates the first down-sampled signal output from the adaptive target signal transfer system; canceling out the simulated output signal by means of the first down-sampled signal to output a signal subjected to cancellation; and updating a filtering coefficient for the filtering processing so that the simulated output signal simulates the first down-sampled signal based on the signal subjected to cancellation; up-sampling the signal output from the adaptive filter to the same sampling frequency as that at which the signal output from the adaptive target signal transfer system is sampled and that adds the up-sampled signal to a signal outside the specific band in the signal output from the adaptive target signal transfer system and outputs a result of addition to the closed loop; determining an amplitude characteristic of the closed loop in accordance with the filtering coefficient used for the filtering processing of the adaptive filter; and controlling a filtering characteristic of the anti-feedback filter so that a peak gain of a frequency among gain of the specific band in the determined amplitude characteristic of the closed loop is suppressed; estimating a gain of the closed loop outside the specific band in accordance with the determined amplitude characteristic in the specific band of the closed loop; and controlling an amount of suppression of the anti-feedback filter outside the specific band in accordance with a result of estimation.

DETAILED DESCRIPTION OF THE PREFERRED EMBODIMENTS

First Embodiment

A first embodiment of the present invention is hereunder described by reference to the drawings.

Figure 1:
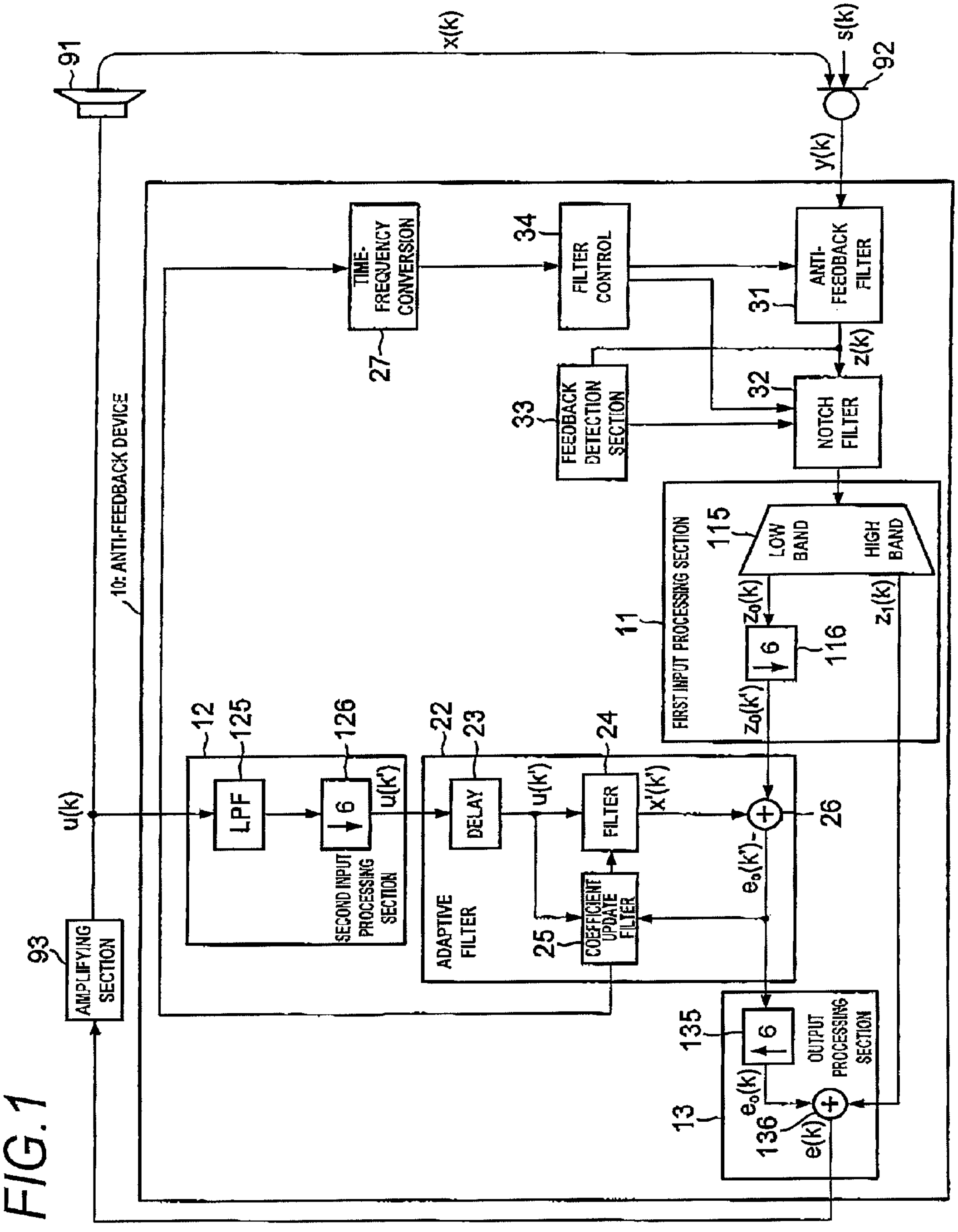
FIG. 1 shows the configuration of an amplification system including an anti-feedback device according to a first embodiment of the present invention.

FIG. 1 shows the configuration of an amplification system including an anti-feedback device 10 of a first embodiment of the present invention. The anti-feedback device 10 is a device that performs the function of suppressing feedback in a closed loop including a speaker 91, a microphone 92, the anti-feedback device 10, and an amplifying section 93 (hereinafter called simply a "closed loop"). The anti-feedback device 10 is interposed between the microphone 92 and the amplifying section 93 of the amplification system that amplifies sound, which has been collected in acoustic space by the microphone 92, through use of the amplifying section 93 and that emits the thus-amplified sound to the acoustic space from the speaker 91. When the microphone 92 and the speaker 91 that emits the sound collected by the microphone 92 are disposed in a single acoustic space, some of the sound emitted from the speaker 91 arrives at the microphone 92 as circulatory sound. A circulatory sound component x (k) and a time T required by transmission of the circulator sound are determined on the basis of a positional relationship between the speaker 91 and the microphone 92 in the acoustic space.

The sound collected by the microphone 92 is input as a signal y(k) to the anti-feedback device 10. The signal y(k) includes a sound component s(k) developed in the acoustic space and the circulatory sound component x(k) emitted from the speaker 91 a time τ earlier. The audio signal y(k) input to the anti-feedback device 10 is amplified by the amplifying section 93 after having undergone signal processing of the anti-feedback device 10. A signal u(k) amplified by the amplifying section 93 is input to the speaker 91. Details of signal processing of the anti-feedback device 10 will be described later.

The speaker 91 emits the signal u(k) input to itself as sound in the acoustic space. Thus, there arises repeated sound circulation in which some of the sound emitted from the speaker 91 arrives at the microphone 92 as circulatory sound and in which sound including both the circulator sound component x(k) and a sound component s(k) occurred in the acoustic space is collected by the microphone 92.

An anti-feedback filter 31 is; for instance, an IIR (Infinite Impulse Response) filter. The anti-feedback filter 31 subjects the signal y(k) to filtering processing for suppressing feedback, thereby outputting a filtered signal z(k). A filter controller 34 updates a center frequency and a level of filtering processing of the anti-feedback filter 31 and a parameter Para-m (m=1, 2, . . . ) that specifies a Q value. Updating will be later described in detail.

A feedback detection section 33 detects occurrence of feedback in a closed loop in accordance with the signal z(k) output from the anti-feedback filter 31 and a frequency at which feedback arises. In addition to a pitch detection method and an FFT (Fast Fourier Transform) analysis method, a method using a bandpass filter has also been known as a method for detecting occurrence of feedback by means of the feedback detection section 33. The feedback detection section 33 of the embodiment may also detect feedback by use of any of the methods.

The notch filter 32 is; for instance, an IIR filter. When the feedback detection section 33 detects a frequency at which feedback arises, the notch filter 32 subjects the signal z(k) output from the anti-feedback filter 31 to attenuation processing for attenuating a component of the frequency. After starting attenuation processing, the notch filter 32 returns the gain of attenuation processing to a gain achieved before the reduction of the frequency component under control of the filter controller 34, and its detailed descriptions will be provided later.

A first input processing section 11 selects a signal, which belongs to a low band, from the signal z(k) output to the first input processing section 11 from a signal transfer system (hereinafter called an "adaptive target signal transmission system pw-1") consisting of the speaker 91, a path along which circulatory sound transmits in the acoustic space, the microphone 92, the anti-feedback filter 31, and the notch filter 32. The first input processing section down-samples the selected signal to a sampling frequency suitable for the band, outputting the thus-sampled signal. More specifically, a band division section 115 in the first input processing section 11 divides the signal z(k) input from the anti-feedback filter 31 by way of the notch filter 32 into two bands; namely, a high band and a low band, and outputs a high band signal $z_1(k)$ and a low band signal $z_0(k)$. By way of example, the following descriptions are provided on the assumption that a sampling frequency fs at which the signal u(k) output from the amplifying section 93 and the signal y(k) input by way of the microphone 92 is 48 kHz; the band division section 115 outputs a component of band having a frequency fs/12=4 kHz or more in the signal z(k) as the high band signal $z_1(k)$; and that the band division section 115 outputs a component of band having a frequency fs/12=4 kHz or less in the signal z(k) as the low band signal $z_0(k)$. Moreover, a down-sampler 116 in the first input processing section 11 subjects the low band signal $z_0(k)$ output from the band division section 115 to ⅙ down-sampling and outputs a result of down-sampling as a signal $z_0(k')$ having a sampling frequency fs/6=8 kHz.

A second input processing section 12 selects a signal, which belongs to a low band, from a signal u(k) input from the amplifying section 93 to the adaptive target signal transfer system pw-1 and that down-samples the selected signal to a sampling frequency suitable for the band, outputting the thus-sampled signal. Specifically, an LPF 125 in the second input processing section 12 allows passage of only a signal belonging to a band having a frequency of 4 kHz or less in the signal u(k) output from the amplifying section 93. A down-sampler 126 in the second input processing section 12 subjects a signal passed through the LPF 125 to ⅙ down-sampling, outputting a result of sampling as a signal u(k') having a sampling frequency fs/6=8 kHz.

In an adaptive filter 22, a delay section 23 delays the signal u(k') output from the down-sampler 126 by a time τ, outputting the thus-delayed signal. A filter 24 performs convolution of a sample train of the signal u(k') supplied by way of the delay section 23 and a filter coefficient set supplied from a filter coefficient update section 25 and outputs a result of convolution processing as a simulated output signal x'(k'). A subtraction section 26 cancels out the simulated output signal x'(k') by means of the low band signal $z_0(k')$ output from the down-sampler 116 and outputs a result of cancellation as an error signal $e_0(k')$. Pursuant to an adaptive algorithm, such as an LMS (Least Mean Square) algorithm, the filter coefficient update section 25 updates, in accordance with the error signal $e_0(k')$, a filter coefficient set to be supplied to the filter 24. As a result of repeated updating of the filter coefficient set of the filter 24 by means of the error signal $e_0(k')$, a transfer function Ho'(jω) of the filter 24 becomes analogous to a transfer function H(jω) of the adaptive target signal transfer system pw-1.

An output processing section 13 up-samples the error signal $e_0(k')$ output from the adaptive filter 22 to the same sampling frequency as that of the signal z(k) output from the adaptive target signal transfer system pw-1 and adds the up-sampled signal to the high band signal $z_1(k)$ and outputs a resultant signal to the closed loop. A specific explanation of the means is that an up-sampler 135 in the output processing section 13 subjects the error signal $e_0(k')$ output from the adaptive filter 22 to 6-times up-sampling, and a result of up-sampling is output as a signal $e_0(k)$ having a sampling frequency fs=48 kHz. An addition section 136 in the output processing section 13 adds the signal $e_0(k)$ output from the up-sampler 135 to the high band signal $z_1(k)$ output from the band division section 115 and outputs a result of addition as a signal e(k).

A time-frequency conversion section 27 determines an amplitude characteristic R(ω) of the closed loop by means of a filtering coefficient used in filtering processing of the adaptive filter 22. Every time the filter coefficient updating section 25 updates a filtering coefficient of the filter 24, the time-frequency conversion section 27 subjects an updated filter coefficient to FFT, thereby acquiring its transfer function Ho'(jω). A power spectrum Lo'(ω) (dB) determined by substituting the transfer function Ho'(jω) into the following equation is taken as an amplitude characteristic R(ω) of the closed loop.

$$Lo'(\omega)=10\log_{10}(|Ho'(j\omega)|^2) \tag{1}$$

The adaptive target signal transfer system pw-1 corresponds to a system obtained by subtracting the first input processing section 11, the adaptive filter 22, the output processing section 13, and the amplifying section 93 from the closed loop. Hence, it can safely be said that the adaptive target signal transfer system pw-1 and the closed loop are substantially equal to each other in terms of an amplitude characteristic. Meanwhile, the filtering coefficient update section 25 updates a filtering coefficient of the filter 24 in accordance not with the signal z(k) output from the adaptive target signal transfer system pw-1 but with a low band signal $z_0(k')$ including only a low-band frequency component of the output signal. Accordingly, the amplitude characteristic R(ω) determined from an updated filtering coefficient of the filter 24 by the time-frequency conversion section 27 becomes an amplitude characteristic exhibiting a peak in only a low band and not exhibiting a high-band peak that should originally be present in the amplitude characteristic.

The filter controller 34 performs first control operation, second control operation, and third control operation. The first control operation is a control for controlling a filtering characteristic of the anti-feedback filter 31 so that a low-band gain in the amplitude characteristic R(ω) determined by the time-frequency conversion section 27 suppresses a gain of the frequency exhibiting a peak; the second control operation is a control for estimating a high-band gain in a closed loop in accordance with the amplitude characteristic R(ω) and controlling the amount of suppression of a high band in the anti-feedback filter 31 in accordance with a result of estimation; and the third control operation is a control for, when the anti-feedback filter 31 attenuates a signal having the same frequency as that whose gain is reduced through attenuation processing of the notch filter 32, returning a gain of the frequency in the notch filter 32 to a gain acquired before reduction of the signal.

Figure 2A:
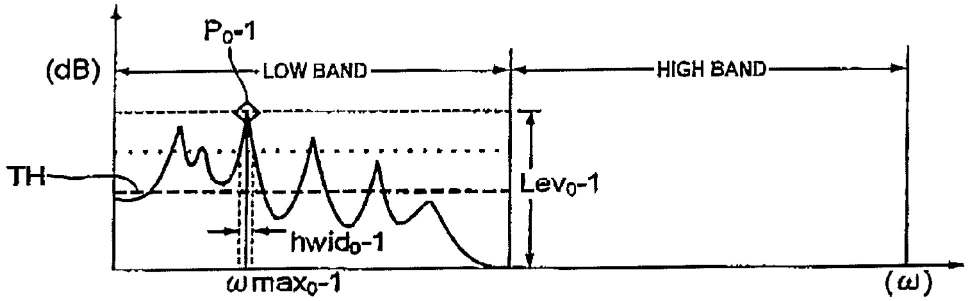
FIGS. 2A and 2B show a state of extraction of peak information $REF_0$ performed by a filter controller of the anti-feedback device shown in FIG. 1.
Figure 2B:
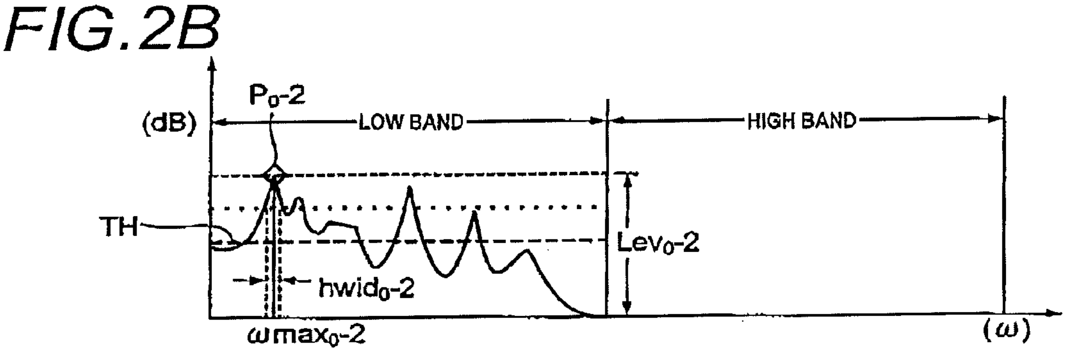

During the first control operation, the filter controller 34 extracts, as peak information $REF_0$-k (k=1, 2, . . . ) about a peak $P_0$-k (k=1, 2, . . . ), a frequency $\omega max_0$-k (k=1, 2, . . . ) achieved at a peak $P_0$-k (k=1, 2, . . . ), a level $Lev_0$-k (k=1, 2, . . . ), and a half bandwidth $hwid_0$-k (k=1, 2, . . . ) that appear in the amplitude characteristic R(ω) determined by the time-frequency conversion section 27. Specific procedures for extracting the peak information $REF_0$-k(k=1, 2, . . . ) are as follows. As shown in FIG. 2A, a frequency $\omega max_0$-1, a level $Lev_0$-1, and a half bandwidth $hwid_0$-1 of the maximum peak Po-1 of the amplitude characteristic R(ω) are first extracted as peak information $REF_{0-1}$. Subsequently, as shown in FIG. 2B, the level of the maximum peak Po-1 is sufficiently attenuated, and a frequency $\omega max_0$-2, a level $Lev_0$-2, and a half bandwidth $hwid_0$-2 of the attenuated amplitude characteristic R(ω) are extracted as peak information $REF_0$-2. Subsequently, like procedures are iterated until a peak exceeding a threshold value TH disappears. Peak information $REF_0$-k (k=3, 4, . . . ) about remaining peaks $P_0$-k(k=3, 4, . . . ) is extracted.

Upon extraction of peak information $REF_0$-k (k=1, 2, . . . ) about all of the peaks $P_0$-k (k=1, 2, . . . ) exceeding the threshold value TH, the filter controller 34 selects parameters Para-m, which are equal in number to peak information $REF_0$-k (k=1, 2, . . . ), as update candidates from the parameters Para-m (m=1, 2, . . . ) of the anti-feedback filter 31; and updates the parameters Para-m taken as update candidates so that the frequency $\omega max_0$-k (k=1, 2, . . . ) represented by the peak information $REF_0$-k (k=1, 2, . . . ) coincides with the center frequency; that a half bandwidth $hwid_0$-k (k=1, 2, . . . ) represented by the peak information $REF_0$-k (k=1, 2, . . . ) coincides with a Q value; and that a difference between a level $Lev_0$-k (k=1, 2, . . . ) represented by the peak information $REF_0$-k (k=1, 2, . . . ) and a predetermined value (e.g., 0 dB) coincides with a gain.

Figure 3:
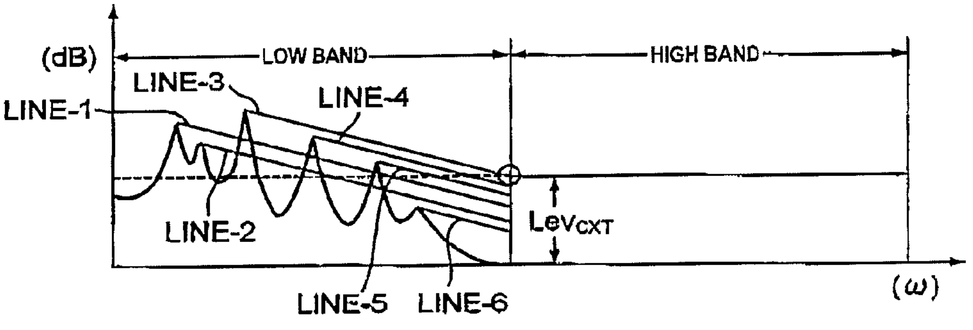
FIG. 3 shows a state of extraction of peak information $REF_1$ performed by a filter controller of the anti-feedback device shown in FIG. 1.

During the second control operation, the filter controller 34 extracts, as peak information $REF_1$, an estimated level value (hereinafter described as "estimated level $Lev_{CXT}$") of a high-band peak $P_1$ that would have appeared in the amplitude characteristic R(ω) when the filtering coefficient of the filter 24 is updated in accordance with an output signal z(k). Specific procedures for extracting the peak information $REF_1$ are as follows. As shown in FIG. 3, lines LINE-k (k=1, 2, . . . ) having a gradient A (−dB/octave) at which a gain is attenuated by a predetermined level each time are plotted from a peak $P_0$-k (k=1, 2, . . . ) of the frequency $\omega max_0$-k (k=1, 2, . . . ) represented by the peak information $REF_0$-k (k=1, 2, . . . ) toward a high band. There is performed level estimation processing for taking, as an estimated level $Lev_{CXT}$ of the high band, the maximum value of the level Lev achieved at a point of intersection of the line LINE-k (k=1, 2, . . . ) and a boundary between the low band and the high band. A result of processing is taken as peak information $REF_1$.

Upon extraction of the peak information $REF_1$, the filter controller 34 selects one parameter Para-m, which is not taken as an update candidate during the first control operation, from among the parameters Para-m (m=1, 2, . . . ) of the anti-feedback filter 31; and updates the parameter Para-m so that all frequency components in the high band are indiscriminately suppressed by an amount corresponding to the level $Lev_{CXT}$ represented by the peak information $REF_1$.

During the third control operation, every time any parameter Para-m (m=1, 2, . . . ) of the anti-feedback filter 31 is updated, the filter controller 34 takes a center frequency represented by an updated parameter Para-m (m=1, 2, . . . ) as $\omega^P$, a gain represented by the parameter as $g^P$, and a "q" value represented by the parameter as $q^P$. Further, a center frequency of the notch filter 32 is taken as $\omega^n$; a gain of the filter is taken as $g^n$; and a "q" value of the filter is taken as $q^n$. In this case, when conditions represented by the expressions provided below are fulfilled by any updated parameter Para-m (m=1, 2, . . . ), a control signal for commanding that a gain of attenuation processing of the notch filter 32 be retuned to a gain acquired before attenuation is output to the notch filter 32.

$$|\omega^P-\omega^n|/\omega^P \leqq 2^{1/q} \text{ and } g^P/g^n \geqq 1 \qquad (2)$$

The anti-feedback device 10 of the embodiment selects the low-band signal $z_0(k)$ among signals y(k) input by way of the microphone 92, and a low-band signal $z_0(k')$ acquired as a result of down-sampling of the low-band signal $z_0(k)$ is taken as an object of processing performed by the adaptive filter 22. Meanwhile, an amplitude characteristic of the adaptive target signal transfer system pw-1 determined from the filtering coefficient of the filter 24 in the adaptive filter 22 is taken as an amplitude characteristic R(ω) of the closed loop. The filtering characteristic of the anti feedback filter 31 is controlled so as to suppress a gain of a frequency at which a low-band gain of the amplitude characteristic R(ω) exhibits a peak. A high-band gain of the closed loop is estimated from the amplitude characteristic R(ω). An amount of suppression of the high band performed by the anti-feedback filter 31 is controlled in accordance with a result of estimation. Therefore, the amount of arithmetic calculation required to update the filtering coefficient of the filter 24 in the adaptive filter 22 is reduced, and processing for suppressing feedback over all frequency bands including the low band and the high band can be performed at high speed.

Second Embodiment

A second embodiment of the present invention will be hereinbelow described by reference to the drawings.

According to an aspect of the invention, there is provided an anti-feedback device including: a plurality of anti-feedback filters; a first input processing section that divides the signal output from the adaptive target signal transfer system into a plurality of bands, and that outputs band signals belonging to the divided bands as signals of sampling frequencies suitable for the respective bands; a second input processing section that selects respective band signals belonging to the plurality of bands from a signal input to the adaptive target signal transfer system and that outputs selected band signals as signals of sampling frequencies suitable for the respective bands; a plurality of adaptive filters that correspond to the plurality of respective bands, wherein each adaptive filter subjects the corresponding band signal output from the second input processing section to filtering processing, to thus generate a band-specific simulated output signal simulating the corresponding band signal from the adaptive target signal transfer system by way of the first input processing section, outputs a band-specific error signal generated by canceling the band-specific simulated output signals from the corresponding band signal output by way of the first input processing section, and updates a filtering coefficient for filtering processing so that the band-specific simulated output signal simulates the corresponding band signal output by way of the first input processing section; an output processing section that subjects to addition the band specific error signals output respectively from the plurality of adaptive filters as signals having the same sampling frequencies as those of the signal output from the adaptive target signal transfer system and that outputs a result of addition to the inside of the closed loop; a time-frequency conversion section that determines an amplitude characteristic of the closed loop in accordance with a filtering coefficient used for filtering processing of the respective band signals in the plurality of adaptive filters; and a filter control section that controls filtering characteristics of the plurality of anti-feedback filters so that peak gains in respective bands belonging to the amplitude characteristic of the closed loop determined by the time-frequency conversion section are suppressed.

The anti-feedback device divides a signal input to the adaptive target signal transfer system into signals of a plurality of bands, as well as dividing a signal output from the adaptive target signal transfer system into signals of a plurality of bands. The anti-feedback device updates filtering coefficients of the adaptive filters corresponding respectively to the plurality of bands by use of the signals. The filter controller controls respective filtering characteristics of a plurality of anti-feedback filters so that a peak gain of frequency of amplitude characteristics of respective bands of a closed loop determined from the respective filtering coefficients of the plurality of adaptive filters is suppressed. Therefore, updating of the filtering coefficients of the adaptive filters and control of filtering characteristics of the anti-feedback filters can simultaneously be performed on a per-band basis. Processing for suppressing feedback over the entire band can be performed at high speed.

Figure 4:
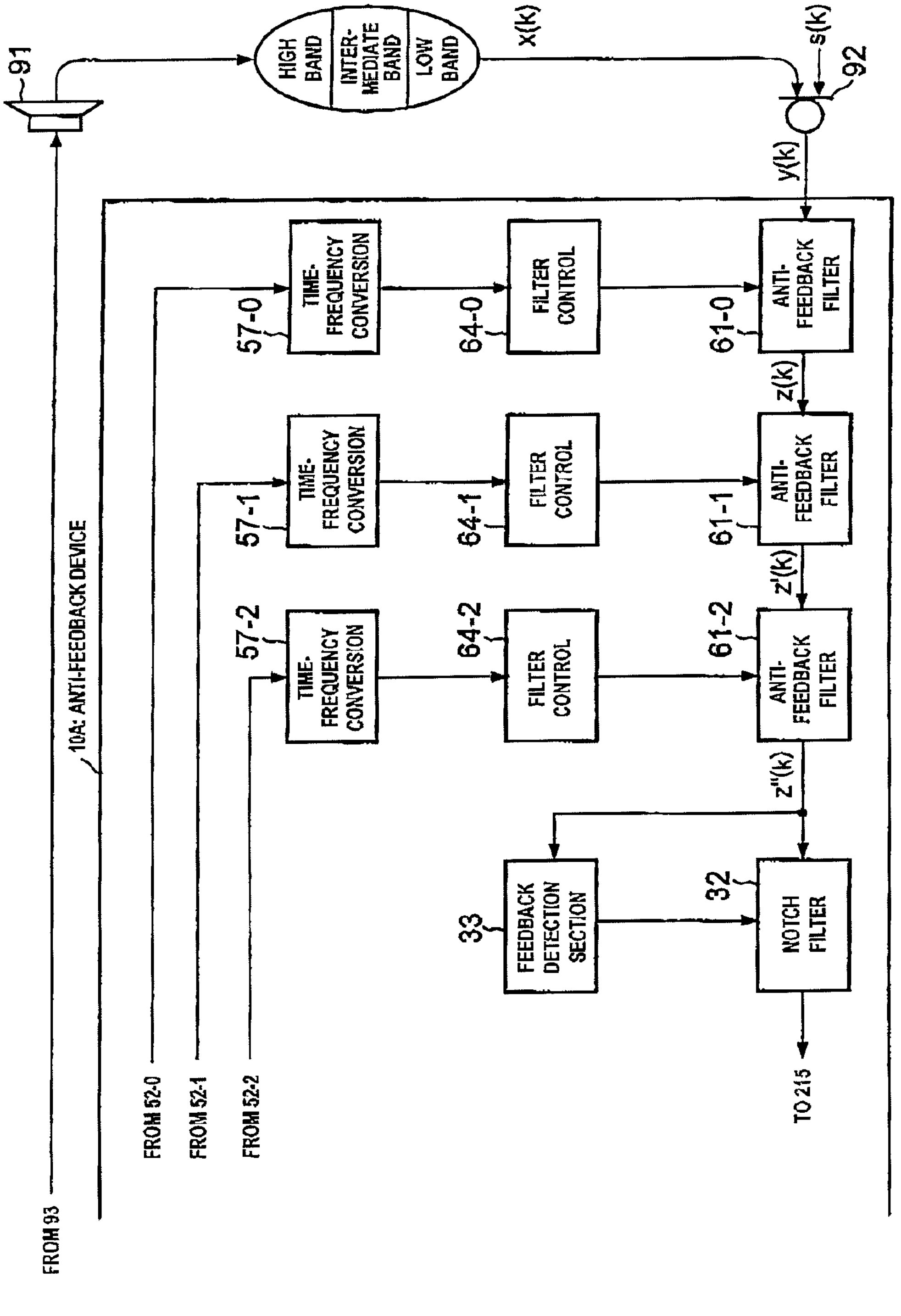
FIG. 4 shows the configuration of an amplification system including an anti-feedback device according to a second embodiment of the present invention.
Figure 5:
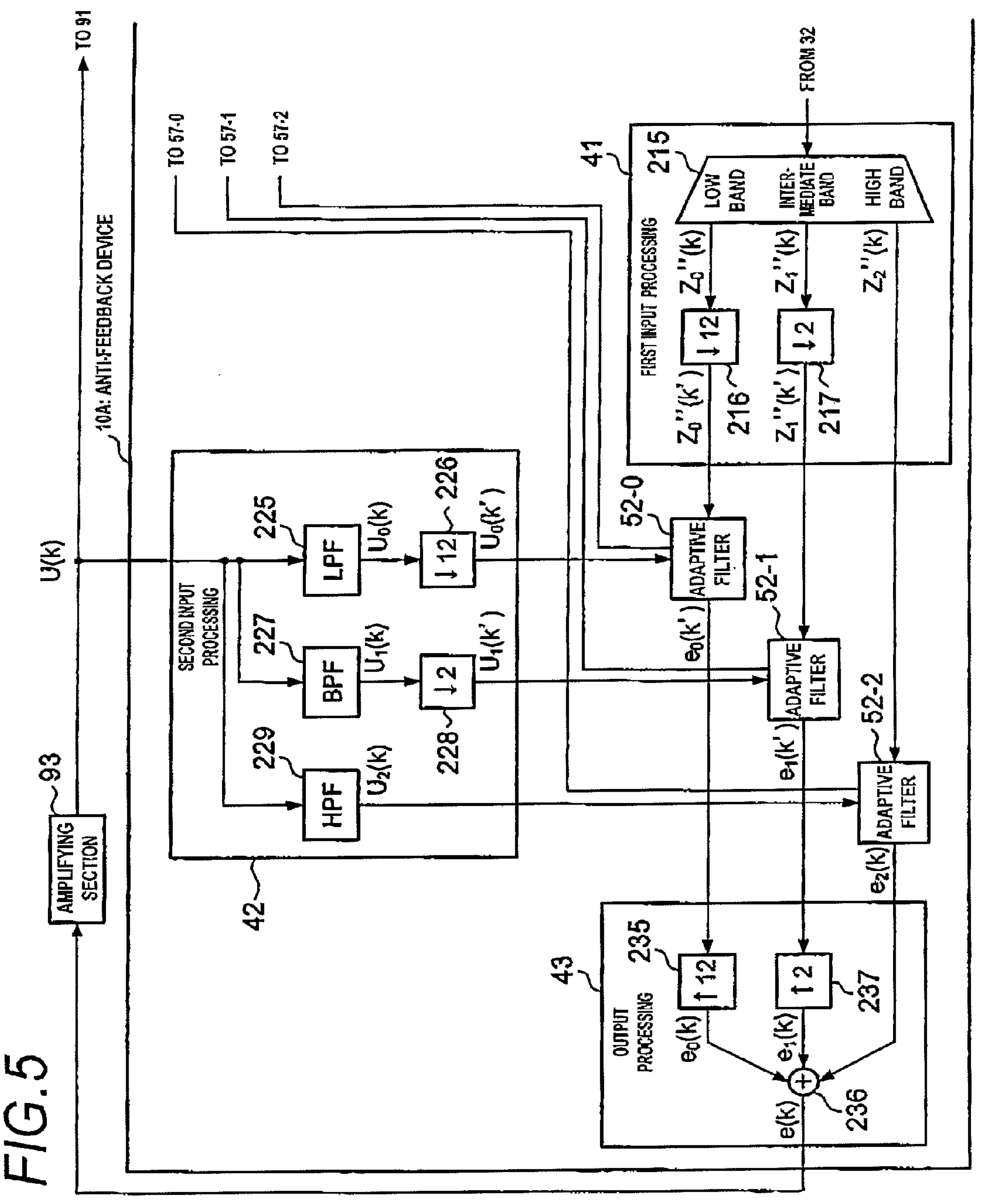
FIG. 5 shows the configuration of the amplification system including an anti-feedback device according to the second embodiment of the present invention.

FIGS. 4 and 5 show the configuration of an amplification system including an anti-feedback device 10A of a second embodiment of the present invention. In FIGS. 4 and 5, constituent elements which are the same as those of the anti-feedback device 10 of the first embodiment (FIG. 1) are assigned the same reference numerals, and their repeated explanations are omitted here for brevity.

An anti-feedback filter 61-0 of the anti-feedback device 10A subjects a signal y(k) output from the microphone 92 to filtering processing and outputs a filtered signal z(k). An anti-feedback filter 61-1 subjects the signal z(k) output from the anti-feedback filter 61-0 to filtering processing and outputs a filtered signal z'(k). An anti-feedback filter 61-2 subjects a signal z'(k) output from the anti-feedback filter 61-2 to filtering processing, outputting a filtered signal z"(k).

The first input processing section 41 divides, into three bands; namely, a low band, an intermediate band, and a high band, the signal z"(k) output to the first input processing section 41 from a signal transfer system (an "adaptive target signal transfer system pw-2") consisting of the speaker 91, a circulatory sound transmission path in an acoustic space, the microphone 92, the anti-feedback filter 61-0, the anti-feedback filter 61-1, the anti-feedback filter 61-2, and the notch filter 32; and outputs band signals belonging to the thus-divided bands as signals having sampling frequencies suitable for the respective bands.

A specific explanation is that a band division section 215 in the first input processing section 41 divides the signal z"(k) input from the anti-feedback filter 61-2 by way of the notch filter 32 into three bands; namely, a low band, an intermediate band, and a high band, and outputs three types of band signals, a low-band signal $z_0$"(k), an intermediate-band signal $z_1$"(k), and a high-band signal $z_2$"(k). By way of example, the following descriptions are based on the assumption that a sampling frequency of the signal u(k) output from the amplifying section 93 and a sampling frequency of the signal y(k) input by way of the microphone 92 are fs=48 kHz; and that the band division section 215 outputs a component in a band of less than 2 kHz in the signal z"(k) as a low-band signal $z_0$"(k), outputs a component in a band ranging from 2 kHz to 12 kHz as an intermediate-band signal $z_1$"(k), and outputs a component in a band of 12 kHz or more as a high-band signal $z_2$"(k). A down-sampler 216 in the first input processing section 41 subjects the low-band signal $z_0$"(k) output from the band division section 215 to 1/12 down-sampling, outputting a result of down-sampling as a signal $z_0$"(k) having a sampling frequency fs/12=4 kHz. A down-sampler 217 in the first input processing section 41 subjects the intermediate-band signal $z_1$"(k') output from the band division section 215 to ½ down-sampling and outputs a result of down-sampling as a signal $z_1$"(k') having a sampling frequency fs/2=24 kHz.

A second input processing section 42 selects band signals belonging to a low band, an intermediate band, and a high band from the signal u(k) input from the amplifying section 93 to the adaptive target signal transfer system pw-2; and that outputs the thus-selected band signals as signals having sampling frequencies suitable for the respective bands. A specific explanation is that an LPF 225 in the second input processing section 42 allows passage of only a signal $u_0$(k) belonging to a band of 2 kHz or less in the signal u(k) output from the amplifying section 93. A down-sampler 226 in the processing section 42 subjects the signal $u_0$(k) passed through the LPF 225 to 1/12 down-sampling and outputs a signal $u_0$(k') having a sampling frequency fs/12=4 kHz. A BPF 227 in the second input processing section 42 allows passage of only a signal $u_1$(k) belonging to a band ranging from 2 kHz to 12 kHz in the signal u(k) output from the amplifying section 93. A down-sampler 228 in the processing section 42 subjects the signal $u_1$(k) passed through the BPF 227 to ½ down-sampling and outputs a result of down-sampling as a signal $u_1$(k') having a sampling frequency fs/2=24 kHz. A HPF 229 in the second input processing section 42 allows passage of only a signal $u_2$(k) belonging to a band of 12 kHz or more in the signal u(k) output from the amplifying section 93.

An adaptive filter 52-0 conforms to a low band; an adaptive filter 52-1 conforms to an intermediate band; and an adaptive filter 52-2 conforms to a high band. Of the three types of adaptive filters 52-0, 52-1, and 52-2, the adaptive filter 52-0 updates an internal filtering coefficient in accordance with signals $z_0$"(k) and $u_0$(k') every time signals $z_0$"(k') and $u_0$(k') commensurate with one sample are input from the down-samplers 216 and 226; performs convolution of the filtering coefficient and the signal $u_0$(k'), to thus generate a simulated output signal $x_0$(k'); and cancels out the simulated output signal $x_0$(k') in the signal $z_0$"(k'), thereby outputting a band-specific error signal $e_0$(k'). Likewise, the adaptive filter 52-1 updates a filtering coefficient and outputs a band-specific error signal $e_1$(k') every time signals $z_1$"(k') and $u_1$(k') commensurate with one sample are input from the down-samplers 217 and 228, and the adaptive filter 52-2 updates a filtering coefficient and outputs a band-specific error signal $e_2$(k) every time signals $z_2$"(k) and $u_2$(k) commensurate with one sample are input from the band division section 215 and the HPF 229. The filtering coefficients of the adaptive filters 52-0, 52-1, and 52-2 are updated in accordance with the adaptive algorithm, such as an LMS algorithm, as in the first embodiment.

An output processing section 43 up-samples the band-specific error signals $e_0$(k') and $e_1$(k') output from the adaptive filters 52-0 and 52-1 to the same sampling frequency as that of the signal z"(k) output from the adaptive target signal transfer system pw-2 and that adds up-sampled signals $e_0$(k) and $e_1$(k) to a signal $e_2$(k) and outputs a result of addition to the closed loop. A specific explanation is that an up-sampler 235 in the output processing section 43 subjects the band-specific error signal $e_0$(k') output from the adaptive filter 52-0 to 12-times up-sampling and outputs a result of up-sampling as a signal having a sampling frequency fs=48 kHz. An up-sampler 237 in the output processing section 43 subjects the band-specific error signal $e_1$(k') output from the adaptive filter 52-1 to 2-times up-sampling, outputting a result of up-sampling as a signal $e_1$(k) having a sampling frequency fs=48 kHz. Moreover, an addition section 236 in the output processing section 43 adds the signal $e_0$(k) output from the up-sampler 235, the signal $e_1$(k) output from the up-sampler 237, and the signal $e_2$(k) output from the adaptive filter 52-2 and outputs a result of addition as a signal e(k).

Every time the filtering coefficient in the adaptive filter 52-0 is updated, a time-frequency conversion section 57-0 determines an amplitude characteristic $R_0(\omega)$ of the closed loop from an updated filtering coefficient. Likewise, every time the filtering coefficient in the adaptive filter 52-1 is updated, a time-frequency conversion section 57-1 determines an amplitude characteristic $R_1(\omega)$ of the closed loop from an updated filtering coefficient. Every time the filtering coefficient in the adaptive filter 52-2 is updated, a time-frequency conversion section 57-2 determines an amplitude characteristic $R_2(\omega)$ of the closed loop from an updated filtering coefficient.

A filter controller 64-0 controls a filtering characteristic of the anti-feedback filter 61-0 so as to suppress a gain of a frequency at which a gain peak appears in a low band of the amplitude characteristic $R_0(\omega)$ determined by the time-frequency conversion section 57-0. Likewise, a filter controller 64-1 controls a filtering characteristic of the anti-feedback filter 61-1 so as to suppress a gain of a frequency at which a gain peak appears in an intermediate band of the amplitude characteristic $R_0(\omega)$ determined by the time-frequency conversion section 57-1. A filter controller 64-2 controls a filtering characteristic of the anti-feedback filter 61-2 so that a gain in a high band of the amplitude characteristic $R_0(\omega)$ determined by the time-frequency conversion section 57-2 suppresses a gain of a frequency at which a peak appears.

The anti-feedback device 10 of the present embodiment divides the signal y(k) input by way of the microphone 92 into three types of band signals; namely, a low-band signal $z_0''(k)$, an intermediate-band signal $z_1''(k)$, and a high-band signal $z_2''(k)$. Of these band signals, the low-band signal $z_0''(k)$ and the intermediate-band signal $z_1''(k)$ are down-sampled to a sampling frequency suitable for the bands. The thus-down-sampled low-band signal $z_0''(k')$ and intermediate signal $z_1''(k')$ and the high-band signal $z_2''(k)$ are taken as objects of processing of the respective adaptive filters 52-0, 52-1, and 52-2. Every time the filtering coefficient in the adaptive filter 52-0 is updated, a filtering characteristic of the anti-feedback filter 61-0 is controlled so that a gain in a low band of the updated amplitude characteristic Ro(ω) suppresses a gain of a frequency at which a peak appears. Every time the filtering coefficient in the adaptive filter 52-1 is updated, a filtering characteristic of the anti-feedback filter 61-1 is controlled so that a gain of an intermediate-band in an updated amplitude characteristic $R_1$ (ω) suppresses a gain of a frequency at which a peak appears.

Every time the filtering coefficient in the adaptive filter 52-2 is updated, a filtering characteristic of the anti-feedback filter 61-2 is controlled so that a gain of a high-band gain in an updated amplitude characteristic $R_2(\omega)$ suppresses a gain of a frequency at which a peak appears. Accordingly, updating of the filtering coefficients of the adaptive filters 52-0, 52-1, and 52-2 and controlling of the filtering characteristics of the anti-feedback filters 61-0, 61-1, and 61-2 are simultaneously performed on a per-band basis, so that processing for suppressing feedback over all of the frequency bands including the low band, the intermediate band, and the high band can be performed at high speed.

Although the embodiment of the present invention has been described thus far, the present invention can also be implemented in other forms of embodiments; for instance, such as those provided below.

(1) In the first embodiment, the filter controller 34 extracts the frequency $\omega max_0$-k (k=1, 2, . . . ), the level $Lev_0$-k (k=1, 2, . . . ), and the half bandwidth $hwid_0$-k (k=1, 2, . . . ), which are achieved at a peak $P_0$-k (k=1, 2, . . . ) appearing in the low band of the amplitude characteristic R(ω), as peak information $REF_0$-k (k=1, 2, . . . ) about the peak $P_0$-k (k=1, 2, . . . ). However, a value other than the half bandwidth $hwid_0$-k (k=1, 2, . . . ) representing the sharpness of the peak $P_0$-k (k=1, 2, . . . ) may also be extracted in place of the half bandwidth $hwid_0$-k (k=1, 2, . . . ), For instance, a bandwidth where the level $Lev_0$-k (k=1, 2, . . . ) comes to $\alpha(L_0'_{MAX}(\omega)+\Lambda)$ in the neighborhood of the frequency $\omega max_0$-k (k=1, 2, . . . ) of the peak $P_0$-k (k=1, 2, . . . ) may also be extracted in lieu of the half bandwidth $hwid_0$-k (k=1, 2, . . . ). $L_0'_{MAX}(\omega)$ represents a level of the maximum peak of the power spectrum $L_0'(\omega)$; Λ denotes an arbitrary threshold value; and α denotes a coefficient of $0 \leqq \alpha \leqq 1$.

(2) In the first embodiment, the filter controller 34 updates the parameter Para-m (m=1, 2, . . . ) of the anti-feedback filter 31 in accordance with the update peak information $REF_0$-k (k=1, 2, . . . ) acquired from the update amplitude characteristic R(ω) and the $REF_1$. However, the filter controller 34 may determine a moving average of the peak information $REF_0$-k (k=1, 2, . . . ) and the $REF_1$ acquired during a certain update time length and update the parameter Para of the anti-feedback filter 31 in accordance with the moving average.

(3) In the first embodiment, every time the filter coefficient update section 25 updates the filtering coefficient of the filter 24, the time-frequency conversion section 27 subjects the thus-updated filtering coefficient to FFT, to thus acquire its transfer function $H_0'(j\omega)$. Power spectrum $L_0'(\omega)$ (dB) determined by substituting the transfer function $H_0'(j\omega)$ into Equation (1) is taken as the amplitude characteristic R(ω) of the closed loop. However, a power spectrum $L_0'(\omega)$, which is not a logarithmic value but a real-number value, may also be taken as the amplitude characteristic R(ω) of the closed loop. A power spectrum $L_0'_{new}(\omega)$ determined by inputting an update power spectrum $L_0'(\omega)$ and an immediately-preceding power spectrum $L_0'_{old}(\omega)$ into the following equation may also be determined as the amplitude characteristic R(ω) of the closed loop. In the following equation, λ represents a coefficient of zero or more; and μ represents a coefficient of one or less.

$$L_0'_{new}(\omega)=\lambda L_0'_{old}(\omega)+\mu L_0'(\omega) \quad (3)$$

(4) In the first embodiment, the filter controller 34 extracts the peak information $REF_0$-k (k=1, 2, . . . ) and the $REF_1$ from the amplitude characteristic R(ω) determined by the time-frequency conversion section 27, and updates the parameter Para-m (m=1, 2, . . . ) of the anti-feedback filter 31 in accordance with the peak information $REF_0$-k (k=1, 2, . . . ) and the $REF_1$. However, the filter controller 34 may also determine, from the amplitude characteristic R(ω) determined by the time-frequency conversion section 27, an amplitude characteristic 1/R(ω) that is an inverse characteristic of the amplitude characteristic, thereby updating the parameter Para of the anti-feedback filter 31 such that the amplitude characteristic 1/R(ω) is realized.

(5) In the first embodiment, the filter controller 34 plots the lines LINE-k (k=1, 2, . . . ) having the gradient A (−dB/octave) at which a gain is attenuated by a predetermined level each time from the peak $REF_0$-k (k=1, 2, . . . ) of the frequency $\omega max_0$-k (k=1, 2, . . . ) represented by the peak information $P_0$-k (k=1, 2, . . . ) toward a high band; and takes, as the estimated level $Lev_{CXT}$ of the high band, the maximum value of the level Lev achieved at a point of intersection of the line LINE-k (k=1, 2, . . . ) and a boundary between the low band and the high band. However, a line LINE-k (k=1, 2, . . . ) having a gradient A (−dB/octave) at which a gain is attenuated by a predetermined level each time from the peak $P_0$-k (k=1, 2, . . . ) of the frequency $\omega max_0$-k (k=1, 2, . . . ) represented by the peak information $REF_0$-k (k=1, 2, . . . ) toward a high band may also be plotted, and the maximum value of the level Lev achieved at a point of intersection of the line LINE-k (k=1, 2, . . . ) and a boundary between the low band and the high band may also be taken as the estimated level $Lev_{CXT}$ of the high band. Alternatively, the filter controller 34 estimates an envelope of a high-band waveform from an envelope of a low-band waveform represented by the peak information $REF_0$-k (k=1, 2, . . . ), and a high-band estimated level $Lev_{CXT}$ may also be determined from the envelope of the waveform. Further, a waveform acquired by filtering the waveform of a low-band-side of the peak information $REF_0$-k (k=1, 2, . . . ) through use of a low-pass filter may also be taken as a high-band-side waveform, a high-band estimation level $Lev_{CXT}$ may also be determined from an envelope of the waveform.

(6) In the first embodiment, the time-frequency conversion section 27 collects amplitudes of adjacent frequency bins of a power spectrum Lo'(ω) acquired by conversion of the transfer function Ho'(jω) of the filtering coefficient of the filter 24 as described in; for instance, JP-A-2001-42033, thereby determining an amplitude characteristic consisting of amplitude values of respective frequencies in a narrow band (e.g., a 1/24 octave band). The filter controller 34 controls a filtering characteristic of the anti-feedback filter 31 so that the gain of the amplitude characteristic suppresses a gain of the frequency where a peak appears.

(7) In the first embodiment, the anti-feedback filter 31 is made up of an IIR filter, and the filter controller 34 updates the center frequency and gain of the anti-feedback filter 31 and the parameter Para specifying a Q value according to the amplitude characteristic R(ω). However, the anti-feedback filter 31 may also be embodied as an FIR (Finite Impulse Response) filter. In the embodiment, according to the amplitude characteristic R(ω), the filter controller 34 updates a sequence of filtering coefficients that determines a filtering characteristic of the anti-feedback filter 31.

(8) In the first and second embodiments, the feedback detection section 33 detects occurrence of feedback and a frequency where feedback arises, in accordance with the signal z(k) output from the anti-feedback filter 31 or 61-2. However, occurrence of feedback and a frequency where feedback arises may also be detected in accordance with another type of signal that circulates through a closed loop, such as a signal y(k) input from the microphone 92, the signals $z_0$(k) and $z_1$(k) obtained by splitting the signal y(k), the signal $e_0$(k) output from the subtraction section 26, and the signal e(k) output from the addition section 136.

(9) In the first and second embodiments, anti-feedback filter 31 or the anti-feedback filters 61-0, 61-1, and 61-2 are inserted into a stage subsequent to the microphone 92. The notch filter 32 and the adaptive filters 22, 52-0, 52-1, and 52-2 are inserted to a stage subsequent to the anti-feedback filter. However, the anti-feedback filters 31, 61-0, 61-1, and 61-2, the notch filter 32, and the adaptive filters 22, 52-0, 52-1, and 52-2 may also be inserted into other locations in a closed loop.

(10) In the first and second embodiments, the feedback detection section 33 detects occurrence of feedback and a frequency at which feedback arises, in accordance with the signals z(k) and z"(k) output from the anti-feedback filters 31 and 61-2. The notch filter 32 subjects the signals z(k) and z"(k) to attenuation processing for attenuating a frequency component detected by the feedback detection section 33. However, the feedback detection section 33 may also detect a frequency at which feedback arises, in accordance with another type of signal in the closed loop, and the notch filter 32 may also subject the signal to attenuation processing.

(11) In first and second embodiments, an LMS algorithm is mentioned as an example of an algorithm for updating the filtering coefficients of the adaptive filters 22, 52-0, 52-1, and 52-2. However, the filtering coefficients may also be updated by means of another algorithm so that the simulated signals $x'_0$(k'), $x'_1$(k'), and $x'_2$(k') output from the adaptive filters 22, 52-0, 52-1, and 52-2 simulate the signals $z_0$(k'), $z_0$"(k'), $z_1$"(k'), and $z_2$"(k') output from the first input processing section 41.

(12) In first and second embodiments, the feedback detecting section 33 and the notch filter 32 are interposed between the first input processing section 11 and the anti-feedback filter. However, the feedback detecting section 33 and the notch filter 32 are not essential to suppress the feedback.

(13) In the first embodiment, during the second control operation of the filter controller 34 to extract the peak information $REF_1$, lines LINE-k (k=1, 2, . . . ) having a gradient A (−dB/octave) at which a gain is attenuated by a predetermined level each time are plotted from a peak $P_0$-k (k=1, 2, . . . ) of the frequency $ωmax_0$-k (k=1, 2, . . . ) represented by the peak information $REF_0$-k (k=1, 2, . . . ) toward a high band. However, instead of the lines LINE-k (k=1, 2, . . . ), curves at which a gain is attenuated in an exponential manner are plotted from the peak $P_0$-k (k=1, 2, . . . ) of the frequency $ωmax_0$-k (k=1, 2, . . . ) represented by the peak information $REF_0$-k (k=1, 2, . . . ) toward a high band can be used.

Further, FIG. 3 shows that the gain of the estimated level $Lev_{CXT}$ of the high band indicates a constant value (i.e., a horizontal line) in the high band. However, the estimated level $Lev_{CXT}$ of the high band may not indicate a constant value, that is, may indicate a line at which a gain is attenuated by a predetermined level, or a curve at which a gain is attenuated in an exponential manner toward a higher band.

(14) In the first embodiment, the band division section 115 in the first input processing section 11 divides the signal z(k) input from the anti-feedback filter 31 by way of the notch filter 32 into two bands; namely, a high band signal $z_1$(k) and a low band signal $z_0$(k), and the low band signal $z_0$(k) is down-sampled by the down-sampler 116. However, the band division section 115 may divide the signal z(k) in various ways instead of dividing the signal z(k) into a low band and a high band. For example, the band division section 115 may be a BPF to extract a specific band signal, and the extracted specific band signal may be down-sampled by the down-sampler 116. In this case, the LPF 125 is changed to a BPF to extract a signal which belongs to a band same as the specific band of the band division section 115.

In the above explanation, the first and second embodiments are separately described. However, the combination of the first and second embodiments can be achieved. A description of the exemplary combination is made as follows. In the second embodiment, the plurality of adaptive filters 52-0, 52-1, 52-2 are provided for the respective band signals (i.e., the low band signal, the intermediate band signal and the high band signal). In the example, the HPF 229, the adaptive filter 52-2, the time-frequency conversion section 57-2, the filter controller 64-2, the anti-feedback filter 61-2 are omitted. As the filter controller 34 in the first embodiment performs, at least one of the filter controllers 64-0, 64-1 performs the second control operation for estimating a high-band gain in a closed loop in accordance with the amplitude characteristics in the low band and the intermediate band, and controlling the amount of suppression of a high band in the anti-feedback filters 61-0, 61-1 in accordance with a result of estimation

What is claimed is:

1. An anti-feedback device comprising:

an anti-feedback filter provided in a closed loop including a microphone and a speaker that are disposed in a single acoustic space, wherein an adaptive target signal transfer system includes at least a route from the speaker to the microphone and the anti-feedback filter;

a first input processing section that selects a signal belonging to a specific band from a signal output from the adaptive target signal transfer system, and that down-samples the selected signal to a sampling frequency suitable for the specific band and outputs the down-sampled signal;

a second input processing section that selects a signal belonging to the specific band from a signal input to the adaptive target signal transfer system, and that down-samples the selected signal to a sampling frequency suitable for the specific band and outputs the down-sampled signal;

an adaptive filter that subjects a signal output from the second input processing section to filtering processing, to thus generate a simulated output signal that simulates a signal output from the adaptive target signal transfer system by way of the first input processing section, that cancels out the simulated output signal by means of the signal output from the first input processing section and outputs a signal subjected to cancellation, and that updates a filtering coefficient for the filtering processing so that the simulated output signal simulates the signal output by way of the first input processing section based on the signal subjected to cancellation;

an output processing section that up-samples the signal output from the adaptive filter to the same sampling frequency as that at which the signal output from the adaptive target signal transfer system is sampled and that adds the up-sampled signal to a signal outside the specific band in the signal output from the adaptive target signal transfer system and outputs a result of addition to the closed loop;

a time-frequency conversion section that determines an amplitude characteristic of the closed loop in accordance with the filtering coefficient used for the filtering processing of the adaptive filter; and a filter control section that controls a filtering characteristic of the anti-feedback filter so that a peak gain of a frequency among gain of the specific band in the amplitude characteristic of the closed loop determined by the time-frequency conversion section is suppressed, that estimates a gain of the closed loop outside the specific band in accordance with the amplitude characteristic in the specific band of the closed loop determined by the time-frequency conversion section, and that controls an amount of suppression of the anti-feedback filter outside the specific band in accordance with a result of estimation.

2. The anti-feedback device according to claim 1, wherein:

the anti-feedback filter is provided in plural;

the first input processing section divides the signal output from the adaptive target signal transfer system into a plurality of bands, and outputs band signals belonging to the divided bands as signals of sampling frequencies suitable for the respective bands;

the second input processing section selects respective band signals belonging to the plurality of bands from a signal input to the adaptive target signal transfer system and outputs selected band signals as signals of sampling frequencies suitable for the respective bands;

the adaptive filter is provided in plural so that the plurality of adaptive filters correspond to the plurality of respective bands, wherein each adaptive filter subjects the corresponding band signal output from the second input processing section to filtering processing, to thus generate a band-specific simulated output signal simulating the corresponding band signal from the adaptive target signal transfer system by way of the first input processing section, outputs a band-specific error signal generated by canceling the band-specific simulated output signals from the corresponding band signal output by way of the first input processing section, and updates a filtering coefficient for filtering processing so that the band-specific simulated output signal simulates the corresponding band signal output by way of the first input processing section;

the output processing section subjects to addition the band specific error signals output respectively from the plurality of adaptive filters as signals having the same sampling frequencies as those of the signal output from the adaptive target signal transfer system and that outputs a result of addition to the inside of the closed loop;

the time-frequency conversion section determines an amplitude characteristic of the closed loop in accordance with a filtering coefficient used for filtering processing of the respective band signals in the plurality of adaptive filters; and the filter control section controls filtering characteristics of the plurality of anti-feedback filters so that peak gains in respective bands belonging to the amplitude characteristic of the closed loop determined by the time-frequency conversion section are suppressed.

3. The anti-feedback device according to claim 1, further comprising:

a feedback detection section that detects occurrence of feedback in the closed loop and a frequency where feedback arises, in accordance with a signal in the closed loop; and a notch filter that attenuates from the signal in the closed loop a signal of a frequency for which the feedback detection section detects feedback, wherein, when the anti-feedback filter comes to attenuate a signal having a frequency identical with the frequency whose gain is decreased by attenuation processing of the notch filter, the filter control section returns the gain of the frequency of the notch filter to a gain achieved before reduction.

4. The anti-feedback device according to claim 3, wherein the filter control section performs a filter control by parameters of a center frequency, a gain and a q-value of the filter.

5. The anti-feedback device according to claim 1, wherein the filter control section estimates the gain of the closed loop outside the specific band on the basis of the peak gain of the frequency in the specific band.

6. An anti-feedback method in a closed loop including an anti-feedback filter, a microphone and a speaker that are disposed in a single acoustic space, wherein an adaptive target signal transfer system includes at least a route from the speaker to the microphone and the anti-feedback filter, the anti-feedback method comprising the steps of:

selecting a first signal belonging to a specific band from a signal output from the adaptive target signal transfer system; and down-sampling the selected signal to a sampling frequency suitable for the specific band to output the first down-sampled signal;

selecting a second signal belonging to the specific band from a signal input to the adaptive target signal transfer system, and down-sampling the selected signal to a sampling frequency suitable for the specific band to output the second down-sampled signal;

subjecting the down-sampled signal of the second signal to filtering processing, to thus generate a simulated output signal that simulates the first down-sampled signal output from the adaptive target signal transfer system; canceling out the simulated output signal by means of the first down-sampled signal to output a signal subjected to cancellation; and updating a filtering coefficient for the filtering processing so that the simulated output signal simulates the first down-sampled signal based on the signal subjected to cancellation;

up-sampling the signal output from the adaptive filter to the same sampling frequency as that at which the signal output from the adaptive target signal transfer system is sampled and that adds the up-sampled signal to a signal outside the specific band in the signal output from the adaptive target signal transfer system and outputs a result of addition to the closed loop;

determining an amplitude characteristic of the closed loop in accordance with the filtering coefficient used for the filtering processing of the adaptive filter; and controlling a filtering characteristic of the anti-feedback filter so that a peak gain of a frequency among gain of the specific band in the determined amplitude characteristic of the closed loop is suppressed; estimating a gain of the closed loop outside the specific band in accordance with the determined amplitude characteristic in the specific band of the closed loop; and controlling an amount of suppression of the anti-feedback filter outside the specific band in accordance with a result of estimation.

* * * * *